United States Patent
Cho et al.

(10) Patent No.: US 6,621,685 B1
(45) Date of Patent: Sep. 16, 2003

(54) ELECTRIC DOUBLE-LAYERED CAPACITOR USING UV-CURING GEL TYPE POLYMER ELECTROLYTE

(75) Inventors: Byung-Won Cho, Seoul (KR); Hee-Woo Rhee, Seoul (KR); Won-Il Cho, Seoul (KR); Hyun-Joong Kim, Seoul (KR); Chun-Mo Yang, Seoul (KR); Yong-Tae Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/339,398

(22) Filed: Jan. 10, 2003

(30) Foreign Application Priority Data

Apr. 3, 2002 (KR) .................... 2002-0018286

(51) Int. Cl.$^7$ ................................ H01G 9/00
(52) U.S. Cl. .............. 361/503; 361/508; 361/512; 361/523; 361/528; 252/62.2; 429/309; 429/326
(58) Field of Search ............... 361/503, 502, 361/504, 510, 512, 516, 523, 528, 508; 429/317, 309, 326; 252/62.2

(56) References Cited

U.S. PATENT DOCUMENTS

| | | | |
|---|---|---|---|
| 6,043,975 A | * | 3/2000 | Kanbara et al. |
| 6,291,106 B1 | * | 9/2001 | Daido et al. |
| 6,426,863 B1 | * | 7/2002 | Munshi |
| 6,430,032 B2 | * | 8/2002 | Sakai et al. |
| 2003/0044688 A1 | * | 3/2003 | Kang et al. |
| 2003/0068562 A1 | * | 4/2003 | Kim et al. |

OTHER PUBLICATIONS

Ishikawa, M. et al., Electric double layer capacitors with new gel electrolytes, *Electrochimica Acta*, vol. 40, No. 13, 14, pp 2217–2222, 1995.

C. Arbizzani et al., "Characterization by impedance spectroscopy of a polymer–based supercapacitor", *Electrochimica Acta*, vol. 40, No. 13 14, pp. 2223–2228, 1995.

* cited by examiner

*Primary Examiner*—Dean A. Reichard
*Assistant Examiner*—Nguyen Ha
(74) *Attorney, Agent, or Firm*—Morrison & Foerster LLP

(57) ABSTRACT

Disclosed is an electric double-layered capacitor fabricated by inserting a UV-curing gel type polymer electrolyte having excellent characteristics of ion conductivity, adhesion to electrode, compatibility with an organic solvent electrolyte, mechanical stability, permeability, and applicability to process, between electrodes. Accordingly, the present invention increases its storage capacitance, reduces self-discharge of electricity, and decreases inner cell resistance.

10 Claims, 4 Drawing Sheets

ELECTRIC DOUBLE-LAYERED CAPACITOR USING UV-CURING GEL TYPE POLYMER ELECTROLYTE

BACKGROUND OF THE INVENTION

1. Field of the Invention

The present invention relates to an electric double-layered capacitor using an UV-curing gel type polymer electrolyte.

2. Background of the Related Art

Generally, an electric double-layered capacitor according to a related art uses an aqueous solution based electrolyte or an organic solution based electrolyte. The aqueous solution based electrolyte includes a strong acid or strong alkaline aqueous solution having the considerably high values of ion conductivity and storage constant, thereby providing excellent characteristics of the electric double-layered capacitor. Since the strong acid or strong alkaline aqueous solution is used, development for electricity collector and components having acid resistance and alkaline resistance is demanded. Moreover, such electrolytes are unable to use at a voltage greater than the electrolysis voltage(1.23 V) of water, thereby having a low operating voltage as well as a limited range of an applicable temperature.

On the contrary, the organic solution based electrolyte has an applicable temperature range of (−)25° C.~85° C. wider than that of the aqueous solution based electrolyte as well as an operating voltage higher than 2 V. Moreover, the organic solution based electrolyte enables to use the electricity collector and components used for the secondary battery. However, when the general organic solution based electrolyte is used, there are disadvantages or problems such as low impregnation maintenance for a wide surface of an active carbon electrode used as an electrode of the electric double-layered capacitor, low attachment and adhesion between an electrode and a separating membrane, deficiency of stability due to leakage liquid, difficulty in designing and manufacturing a large-sized battery, limitation of the size and shape of battery, environmental pollution of the organic solvent, and the like.

In order to overcome the above-mentioned disadvantages or problems, many efforts are made to apply a polymer electrolyte system used widely for the previous secondary battery to EDLS.

Masashi et. al.[Electrochimica Acta, vol. 40, No. 13, 2217(1995)] have developed a gel type polymer electrolyte by adding tetraalkylammonium salt such as tetrabutylammonium perchlorate, tetraethylammonium perchlorate, tetraethylammonium tetrafluoroborate, etc. to poly (acrylonitrile)(PAN) and propylene carbonate(PC).

The gel type plasticized polymer electrolyte has a relatively-high ion conductivity under the condition that a ratio between the organic solvent and salt is optimized in a manner that the salt dissolved in the organic solvent exists in a polymer base resin having bipolar moment. Yet, a dry process is essential to prepare the gel type polymer electrolyte after a heating process at a high temperature over 100° C. Besides, since the base resin has high viscosity at a melted state, the assembly process of the electric double-layered capacitor becomes complicated as well as the product cost increases.

Arbizzani et. al.[Electrochimica Acta, Vol. 40, No. 13, 2223(1995)] and Osaka et. al.[J. Power Sources, 74, 122 (1998), J. electrochemical Society, 146, 1724(1999)] have developed the gel type polymer electrolyte by mixing poly (vinylidene fluoride)(PVdF) and poly(ethylene oxide)(PEO) with ethylene carbonate(EC) and propylene carbonate(PC) and adding the tetraalkylammonium salt to the mixture so as to fabricate the electric double-layered capacitors.

However, the report of Amand et. al.[Solid State Ionics, 94, 35(1997)] teaches that the polymer electrolyte using PEO as the base resin has high crystalline property at the room temperature just to show low conductivity as well as poor adhesion to the electrode.

Hatakimiyo et. al.(WO00/57439) introduces a substitution group having a big bipolar moment to a polyurethane molecule so as to develop a polyurethane polymer compound, which enables to maintain high conductivity and capability of dissolving an ion-conductive salt at high concentration as well as high adhesion and an interface impedance equal to that of the electrolyte solution, and a polymer electrolyte using the ion-conductive salt.

The polymer electrolyte prepared by the above-explained method is coated on a polarizing electrode by various methods, overlapped with a same polarizing electrode, and then hardened. Yet, the electric double-layered capacitor after the hardening process has poor brittleness and ductility.

SUMMARY OF THE INVENTION

Accordingly, the present invention is directed to an electric double-layered capacitor that substantially obviates one or more problems due to limitations and disadvantages of the related art.

An object of the present invention is to provide an electric double-layered capacitor fabricated by inserting a UV-curing gel type polymer electrolyte having excellent characteristics of ion conductivity, adhesion to electrode, compatibility with an organic solvent electrolyte, mechanical stability, permeability, and applicability to process, between electrodes.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electric double-layered capacitor according to the present invention includes at least two electrodes and a UV-curing gel type polymer electrolyte inserted between the electrodes, the UV-curing gel type polymer electrolyte comprising a polymer material, an organic solvent or a liquid electrolyte, a UV-curing initiator, and a UV-curing accelerator, wherein the polymer material includes a function-I polymer selected from the group consisting of polyethyleneglycoldiacrylate(PEGDA), polyethyleneglycoldimethacrylate(PEGDMA), and a mixture of the polyethyleneglycoldiacrylate(PEGDA) and polyethyleneglycoldimethacrylate(PEGDMA) and a function-II polymer selected from the group consisting of a poly(vinyliden fluoride)(PVdF) based polymer, a polyacrylonitrile(PAN) based polymer, a polymethylmethacrylate(PMMA) based polymer, a polyvinyl chloride(PVC) based polymer, and a mixture of the poly(vinyliden fluoride)(PVdF) based polymer, polyacrylonitrile(PAN) based polymer, polymethylmethacrylate(PMMA) based polymer, and polyvinyl chloride(PVC) based polymer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate example(s) of the invention and together with the description serve to explain the principle of the invention. In the drawings.

DETAILED DESCRIPTION OF THE INVENTION

Figure 1:
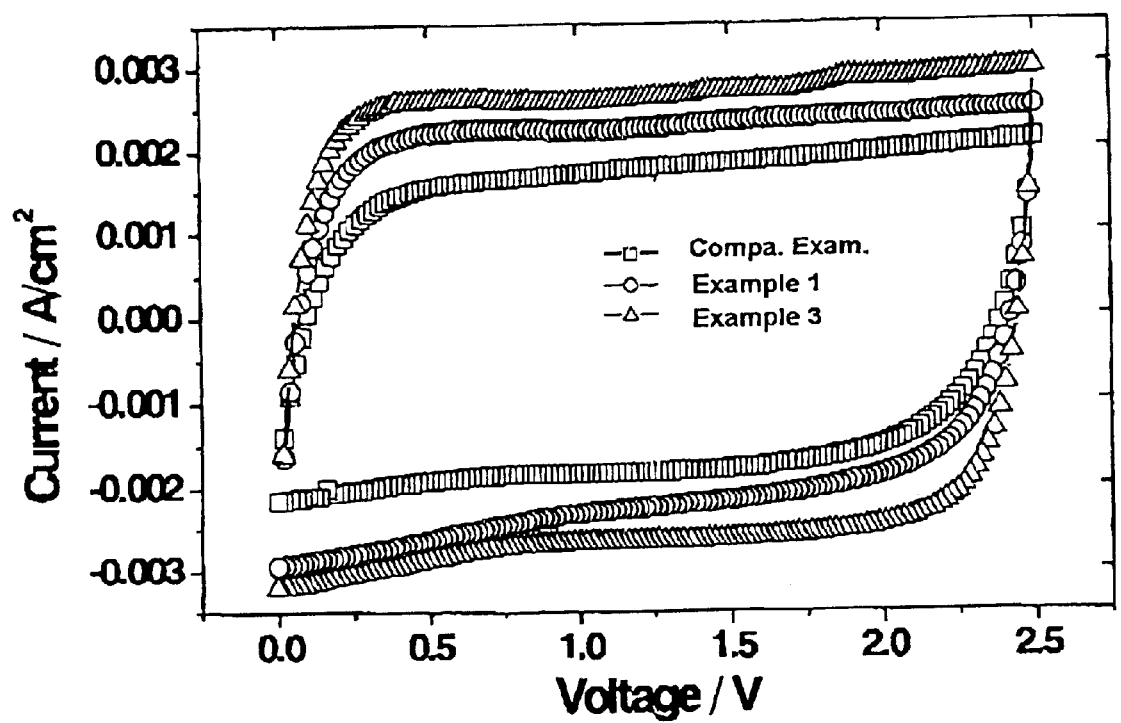
FIG. 1 illustrates a graph of a circulation voltage/current curve of an electric double-layered capacitor according to the present invention.

Reference will now be made in detail to the preferred examples of the present invention, examples of which are illustrated in the accompanying drawings.

An electric double-layered capacitor according to the present invention includes at least two electrodes and a UV-curing gel type polymer electrolyte inserted between. the electrodes, the UV-curing gel type polymer electrolyte comprising a polymer material, an organic solvent or a liquid electrolyte, a UV-curing initiator, and a UV-curing accelerator, wherein the polymer material includes a function-I polymer selected from the group consisting of polyethyleneglycoldiacrylate(PEGDA), polyethyleneglycoldimethacrylate(PEGDMA), and a mixture of the polyethyleneglycoldiacrylate(PEGDA) and polyethyleneglycoldimethacrylate(PEGDMA) and a function-II polymer selected from the group consisting of a poly(vinyliden fluoride)(PVdF) based polymer, a polyacrylonitrile(PAN) based polymer, a polymethylmethacrylate(PMMA) based polymer, a polyvinyl chloride(PVC) based polymer, and a mixture of the poly(vinyliden fluoride)(PVdF) based polymer, polyacrylonitrile(PAN) based polymer, polymethylmethacrylate(PMMA) based polymer, and polyvinyl chloride(PVC) based polymer.

The UV-curing gel type polymer electrolyte has excellent characteristics of ion conductivity, adhesion to electrode, compatibility with an organic solvent electrolyte, mechanical stability, permeability, and applicability to process. Hence, the UV-curing gel type polymer electrolyte is inserted between the at least two electrodes and then bonded to the electrodes just to fabricate the electric double-layered capacitor.

Components of the UV-curing gel type polymer electrolyte used for the electric double-layered capacitor according to the present invention are explained as follows.

(1) As shown in the following chemical formulas 1 and 2, The function-I polymer is selected from the group consisting of ethyleneglycoldiacrylate(EGDA)(I) having two unsaturated functional groups at ends, ethylene glycoldimethacrylate(EGDMA)(II), and a mixture of the ethyleneglycoldiacrylate(EGDA) and ethyleneglycoldimethacrylate(EGDMA) and the function-II polymer is selected from the group consisting of poly(vinyliden fluoride)(PVdF), polyacrylonitrile(PAN), polymethylmethacrylate (PMMA), polyvinyl chloride(PVC), and a mixture of the poly(vinyliden fluoride)(PVdF), polyacrylonitrile (PAN), polymethylmethacrylate(PMMA), and polyvinyl chloride(PVC). And, each of the function-I and function-II polymers is mixed with each other by 5~95 wt % in a total 100 wt % of the polymer material.

$CH_2=CHCOO(CH_2CH_2O)_nCOCH=CH_2$ [Chemical Formula 1]

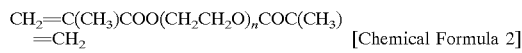

$CH_2=C(CH_3)COO(CH_2CH_2O)_nCOC(CH_3)=CH_2$ [Chemical Formula 2]

(2) The organic solvent includes at least one component selected from the group consisting of N-methyl-2-pyrrolidone(NMP), dimethylformamide(DMF), dimethylacetamide(DMA), tetrahydrofuran(THF), dimethyl sulfoxide(DMSO), and acetone and an added quantity of the organic solvent added to the polymer material is 0~95 wt %.

(3) The liquid electrolyte includes a mixture of at least two selected from the group consisting of ethylene carbonate(EC), propylene carbonate(PC), dimethyl carbonate(DMC), diethyl carbonate(DEC), and ethylmethyl carbonate(EMC) solutions having lithium salt dissolved therein. And, the liquid electrolyte further includes at least one selected from the group consisting of methyl acetate(MA), methyl propionate(MP), ethyl acetate(EA), and ethyl propionate(EP) just to improve a low temperature characteristic of the solutions. And, an amount of the liquid electrolyte is added to the polymer material by 100~900 wt %.

(4) The UV-curing initiator is added to the polymer material by 0.1~5.0 wt % for a total polymer weight.

(5) The UV-curing accelerator is added to the polymer material by 0.1~5.0 wt % for a total polymer weight.

(6) A filler can be added to the polymer material by 0~20 wt % just to increase mechanical strength and liquid-supplementary effect and the filler includes at least one selected from the group consisting of $SiO_2$, $TiO_2$, $Al_2O_3$, $BaTiO_3$, zeolite, and a polymer filler.

The function-I polymer expressed by the chemical formula 1 or 2 in the components of the present invention is an oligomer having one unsaturated functional group at each end and has a molecular weight of 200~700 or more. The number of ethylene oxide($-CH_2CH_2O-$) in the oligomer is 3~14 or more. A quantity of the function-I polymer is about 5~95 wt % of the total weight of the polymer material, and can be adjusted for the purpose of the use. Moreover, the function-II polymer is used as a base resin and mixed with the polymer material by 5~95 wt % of the total weight of the polymer mixture.

The function-I polymer has excellent ion conductivity and molding characteristics just to provide an easy preparation method. And, the function-II polymer has excellent mechanical strength as well as excellent ion conductivity. Hence, when the excellent molding characteristic is required, a portion of the function-I UV-curing polymer is increased. Yet, a portion of the function-II polymer is preferably increased if the mechanical strength is demanded.

The liquid electrolyte component (3) includes a mixture of at least two selected from the group consisting of the ethylene carbonate(EC) solution having high viscosity, the propylene carbonate(PC) solution having high viscosity, the dimethyl carbonate(DMC) solution having excellent permeability, the diethyl carbonate(DEC) solution having excellent permeability, and the ethylmethyl carbonate (EMC) having excellent permeability. And, at least one selected from the group consisting of methyl acetate(MA), methyl propionate(MP), ethyl acetate(EA), and ethyl propionate(EP) is added to the mixture for improving a low temperature characteristic of the solutions. And, an amount of the liquid electrolyte is added to the polymer material by 100~900 wt %. Any of $LiClO_4$, $LiCF_3SO_3$, $LiBF_4$, $LiPF_6$, $LiAsF_6$, $Li(CF_3SO_2)_2N$, and the like, which are used for preparing the conventional polymer electrolyte, can be used as the lithium salt added to the liquid electrolyte. And, a concentration of the lithium salt in the electrolyte can be adjusted to 0.5–1.5M.

At least one of poly(vinyliden fluoride)(PVdF), polyacrylonitrile(PAN), polymethylmethacrylate(PMMA), and polyvinyl chloride(PVC) is dissolved in the organic solvent such as N-methyl-2-pyrrolidone(NMP), dimethylformamide(DMF), dimethylacetamide(DMA), tetrahydrofuran(THF), dimethyl sulfoxide(DMSO), acetone, and the like. And, this mixture solution is blended with the oligomers of polyethyleneglycoldiacrylate (PEGDA) and polyethyleneglycoldimethacrylate (PEGDMA) so as to prepare the polymer mixture having the configuration of permeability. Instead, the polymer mixture can be prepared by blending the polymers of poly(vinyliden fluoride)(PVdF), polyacrylonitrile(PAN), polymethylmethacrylate(PMMA), and polyvinyl chloride (PVC) with the oligomers of polyethyleneglycoldiacrylate (PEGDA) and polyethyleneglycoldimethacrylate (PEGDMA). In this case, the polymers are blended with the oligomers by being swelled in the liquid electrolyte.

The component (4) as the initiator for UV-curing is added by a quantity of 0.1~5.0 wt % of the polymer mixture. And, the quantity can be adjusted by a proper mixing ratio with the added oligomer.

The UV-curing initiator includes at least one selected from the group consisting of 2,2-dimethoxy-2-phenylacetophenone, 2-methoxy-2-phenylacetone, benzyl-dimethyl-ketal, ammonium sulfate, benzophenone, ethyl benzoin ether, isopropyl benzoin ether, α-methyl benzoin ether, benzoin phenyl ether, 2,2-diethoxy acetophenone, 1,1-dichloro acetophenone, 2-hydroxy-2-methyl-1-phenylpropane1-on, 1-hydroxy cyclohexyl phenyl ketone, antraquinone, 2-ethyl antraquinone, 2-chloroantraquinone, tioxantone, isopropyltioxantone, chloro tioxantone, 2,2-chlorobenzophenone, benzyl benzoate, and benzoyl benzoate.

The present invention includes the component (6) as the hardening accelerator for improving the UV-curing rate. For instance, the UV-curing accelerator includes at least one selected from the group consisting of triethyl amine, tributyl amine, triethanol amine, and N-benzyldimethyl amine, and a quantity of the UV-curing accelerator is 0.1~5.0 wt % of the polymer mixture weight.

Besides, various additives such as an adhesion-improving agent, a filler, and the like can be included in the compositions of the present invention for improving the mechanical strength and the interface performance with the electrodes.

A method of preparing a polymer electrolyte film with the above-described compositions is explained as follows.

First of all, the poly(vinyliden fluoride)(PVdF), polyacrylonitrile(PAN), polymethylmethacrylate(PMMA), and polyvinyl chloride(PVC) polymers are added to the organic liquid electrolyte with the above-mentioned ratio for polyethyleneglycoldiacrylate(PEGDA), polyethyleneglycoldimethacrylate(PEGDMA), or the mixture of polyethyleneglycoldiacrylate(PEGDA) and polyethyleneglycoldimethacrylate(PEGDMA), and then agitation is carried out at 50° C.~150° C. for swelling. Instead, the organic liquid solvent such as N-methyl-2-pyrrolidone(NMP), dimethylformamide(DMF), dimethylacetamide(DMA), tetrahydrofuran(THF), dimethyl sulfoxide(DMSO), acetone, and the like is mingled with poly(vinyliden fluoride)(PVdF), polyacrylonitrile(PAN), polymethylmethacrylate(PMMA), and polyvinyl chloride (PVC) with the above-mentioned ratio, and then the resulting solution is added to the mixture solution of polyethyleneglycoldiacrylate(PEGDA), polyethyleneglycoldimethacrylate(PEGDMA)/organic liquid electrolyte.

In this case, it is preferable that an agitation time is taken for at least three hours to secure the mixing sufficiently.

Finally, the UV-curing initiator and accelerator are added thereto, agitation is carried out for 30 seconds~10 minutes, the agitated solution is coated to the proper thickness less than 100 μm on a porous separating membrane made of a glass plate, a mylar film, non-woven fabric, PE, PP, or the like, and then UV-rays are irradiated thereon just to drive the hardening(curing). Instead, the electrolyte can be cast on the electrodes directly just to carry out the UV-curling.

All the above-described preparing processes are carried out at the room temperature with a concentration of moisture smaller than 10 ppm in order to exclude the influence of moisture.

The prepared gel type polymer electrolyte is disposed between active carbon electrodes having a specific surface area of 2,000 $m^2/g$, whereby the electric double-layered capacitor is formed.

Compared to the conventional electric double-layered capacitor using the previous separating membrane and liquid electrolyte, the electric double-layered capacitor fabricated using the UV-curing gel type polymer electrolyte according to the present invention facilitates the handling and integration of the electrodes and electrolyte for battery assembly. Since it is advantageous for the liquid electrolyte to remain in the polymer matrix, the present invention reduces the loss of the electrolyte liquid remarkably. And, the present invention has the excellent adhesion to the active carbon electrode, thereby enabling to reduce inner resistance and self-discharge of electricity.

The UV-curing gel type polymer electrolyte according to the present invention is directly coated on the surface of the active carbon electrode, thereby enabling to greatly reduce the irregular interface resistance generated when the electrode and separating membrane are contacted with each other.

EXAMPLE 1

First of all, 1.5 g of poly(vinylidene fluoride)(PVdF) (Atochem, Kynar 761) dried for at least 24 hours at 80° C., 1 g of polyethyleneglycoldiacrylate(PEGDA)(Aldrich, molecular weight 742) as a UV-curing agent, and 10 g of a liquid electrolyte including ethylene carbonate(EC)/diethylene carbonate(DEC) of 1:1 weight ratio and 1M of $LiPF_6$ are agitated uniformly for 2 hours by 300 rpm at the room temperature, 0.1 g of 2-chlorobenzophenone(Aldrich, molecular weight 216.67) as an initiator is added thereto, the temperature is increased to 125° C., and then mixing is carried out for 30 minutes just to make the mixed solution transparent. The above-formed gel type polymer electrolyte is coated 40~50 µm thick on a non-woven fabric preheated at 80° C. or cast by the Doctor Blade method. UV-ray irradiation is then carried out thereon for one hour by leaving a distance of 10~15 cm from a 100W UV-ray lamp just to induce polymerization of oligomer. Thus, a uniform gel type polymer electrolyte is attained. An electric double-layered capacitor including active carbon electrode having 2,000 $m^2/g$ of specific surface area/gel type polymer electrolyte prepared by the present invention/active carbon electrode is assembled. Thereafter, capacitance and cycle endurance are checked by carrying out charge/discharge of electricity in a manner that the electric double-layered capacitor is charged with 2.5 V of constant voltage and discharges 2 $mA/cm^2$ of constant current.

EXAMPLE 2

First of all, 1.5 g of poly(vinylidene fluoride)(PVdF) (Atochem, Kynar 761) dried for at least 24 hours at 80° C., 1 g of polyethyleneglycoldiacrylate(PEGDA)(Aldrich, molecular weight 742) as a UV-curing agent, and 10 g of a liquid electrolyte including ethylene carbonate(EC)/ diethylene carbonate(DEC)/ethylmethyl carbonate(EMC) of 1:1:1 weight ratio and 1M of $LiPF_6$ are agitated uniformly for 2 hours by 300 rpm at the room temperature, 0.1 g of 2-chlorobenzophenone(Aldrich, molecular weight 216.67) as an initiator and 0.1 g of triethylamine(Aldrich, density 1.73, molecular weight 101.19) are added thereto, the temperature is increased to 125° C., and then mixing is carried out for 30 minutes just to make the mixed solution transparent. The above-formed gel type polymer electrolyte is coated 40~50 µm thick on a mylar film preheated at 80° C. or cast by the Doctor Blade method. UV-ray irradiation is then carried out thereon for one hour by leaving a distance of 10~15 cm from la 100W UV-ray lamp just to induce polymerization of oligomer. Thus, a uniform gel type polymer electrolyte is attained. The charge/discharge test of an electric double-layered capacitor is carried out by the same method of the first example of the present invention.

EXAMPLE 3

First of all, 1.5 g of poly(vinylidene fluoride)(PVdF) (Atochem, Kynar 761) dried for at least 24 hours at 80° C., 1 g of polyethyleneglycoldiacrylate(PEGDA)(Aldrich, molecular weight 742) as a UV-curing agent, and 10 g of a liquid electrolyte including ethylene carbonate(EC)/ diethylene carbonate(DEC)/ethylmethyl carbonate(EMC) of 1:1:1 weight ratio and 1M of $LiPF_6$ are agitated uniformly for 2 hours by 300 rpm at the room temperature, 0.1 g of 2-chlorobenzophenone(Aldrich, molecular weight 216.67) as an initiator and 0.1 g of triethylamine(Aldrich, density 1.73, molecular weight 101.19) are added thereto, the temperature is increased to 125° C., and then mixing is carried out for 30 minutes just to make the mixed solution transparent. The above-formed gel type polymer electrolyte is coated 40~50 µm thick on a PP separating membrane preheated at 80° C. or cast by the Doctor Blade method. UV-ray irradiation is then carried out thereon for one hour by leaving a distance of 10~15 cm from a 100W UV-ray lamp just to induce polymerization of oligomer. Thus, al uniform gel type polymer electrolyte is attained. The charge/ discharge test of an electric double-layered capacitor is carried out by the same method of the first example of the present invention.

COMPARATIVE EXAMPLE

An electric double-layered capacitor including active carbon electrode having 2,500 $m^2/g$ of specific surface area/ liquid electrolyte/active carbon electrode is assembled using a liquid electrolyte including ethylene carbonate(EC)/ diethylene carbonate(DEC) of 1:1 weight ratio and 1M of $LiPF_6$. And, the same test of the first example is carried out thereon.

The UV-curing gel type polymer electrolyte prepared by the present invention enables to improve 20~30% of the current storage by the formation of the electric double layer, and the result is shown in the circulation voltage-current curve of FIG. 1.

Figure 2:
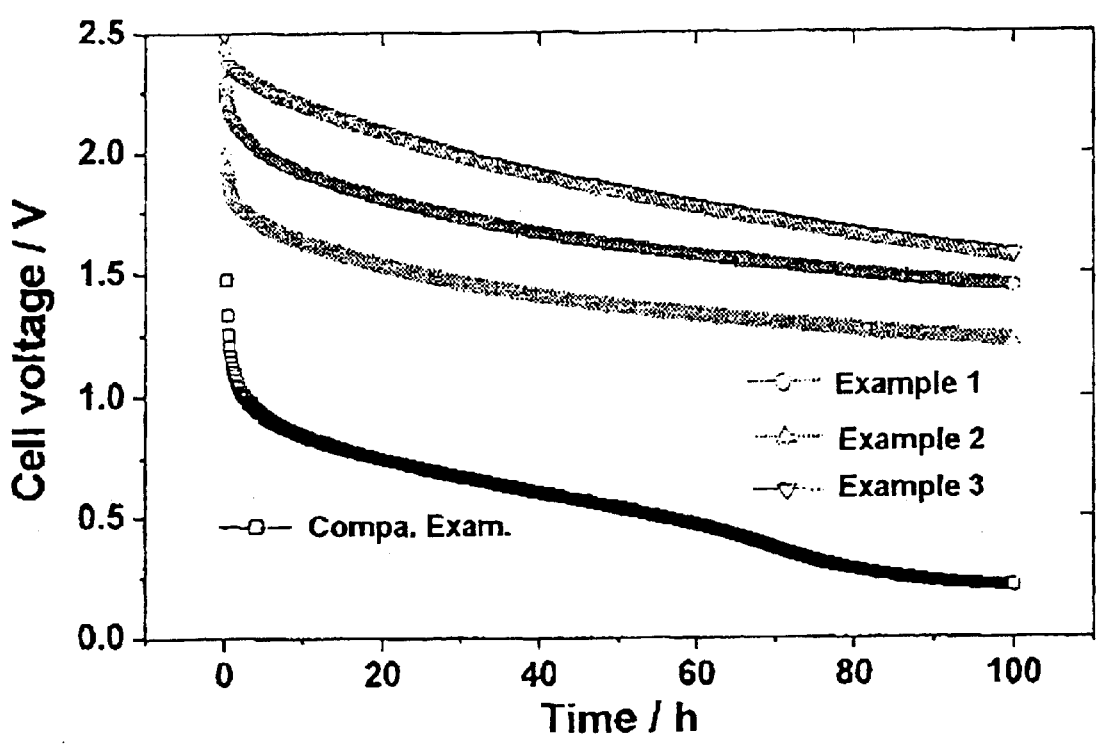
FIG. 2 illustrates a graph of self-discharge of an electric double-layered capacitor according to the present invention after an electric charging.

The UV-curing gel type polymer electrolyte prepared by the present invention provides such an excellent inhibiting effect as 350~500% reduction of self-discharge rate of electricity after 100 hours, and the result is shown in FIG. 2.

Figure 3:
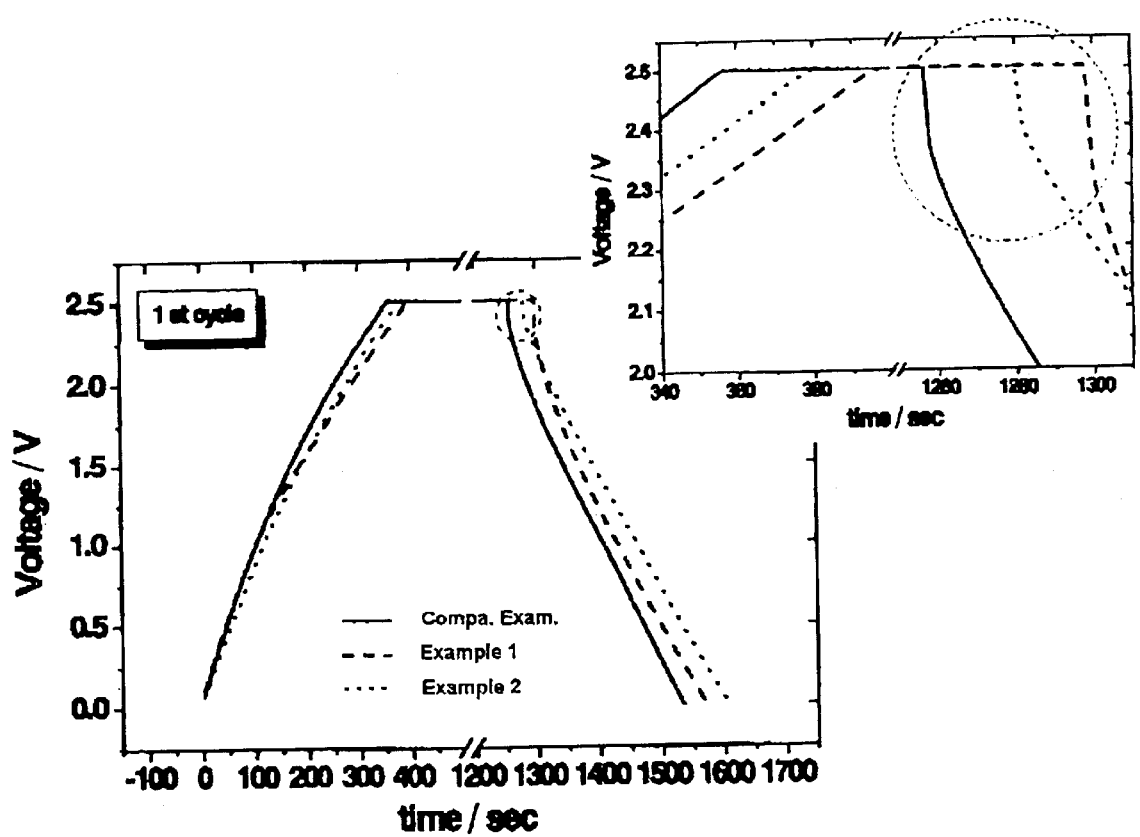
FIG. 3 illustrates a graph of an inner resistance of a battery when an electric double-layered capacitor according to the present invention is charged with electricity or discharges the electricity.

The UV-curing gel type polymer electrolyte prepared by the present invention provides less voltage drop caused by the inner resistance on discharging electricity after charge of electricity, and the result is shown in FIG. 3.

Figure 4:
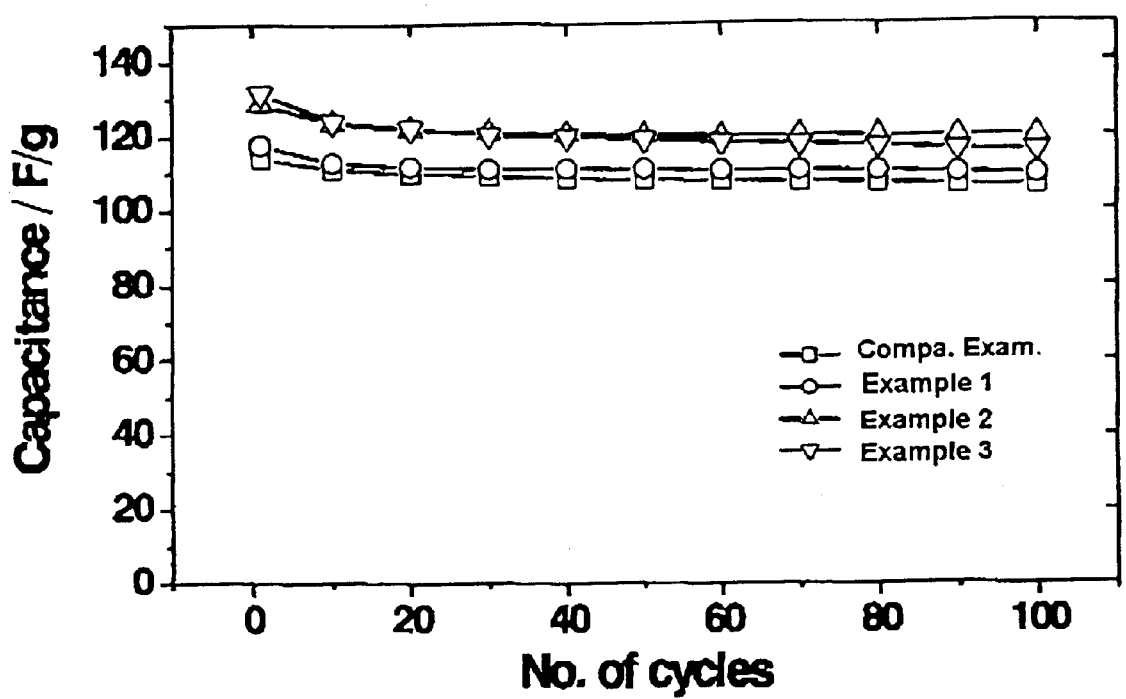
FIG. 4 illustrates a graph of the capacitance and endurance test of an electric double-layered capacitor according to the present invention.

And, the UV-curing gel type polymer electrolyte prepared by the present invention provides such excellent characteristics of capacitance and endurance as at least 10% of improvement, and the result is shown in FIG. 4.

Accordingly, the electric double-layered capacitor according to the present invention increases its storage capacitance, reduces self-discharge of electricity, and decreases inner cell resistance, thereby enabling to be substituted for the conventional electric double-layered capacitor as well as the high-capacitance/output electric double-layered capacitor of an electric car or the like.

The forgoing examples are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled, in the art.

What is claimed is:

1. An electric double-layered capacitor comprising:
   at least two electrodes; and
   a UV-curing gel type polymer electrolyte inserted between the electrodes, the UV-curing gel type polymer electrolyte comprising a polymer material, an organic solvent or a liquid electrolyte, a UV-curing initiator, and a UV-curing accelerator, wherein the polymer material comprises a function-I polymer selected from the group consisting of polyethyleneglycoldiacrylate (PEGDA), polyethyleneglycoldimethacrylate (PEGDMA), and a mixture of the polyethyleneglycoldiacrylate(PEGDA) and polyethyleneglycoldimethacrylate(PEGDMA) and a function-II polymer selected from the group consisting of a poly(vinyliden fluoride)(PVdF) based polymer, a polyacrylonitrile(PAN) based polymer, a polymethylmethacrylate(PMMA) based polymer, a polyvinyl chloride(PVC) based polymer, and a mixture of the poly(vinyliden fluoride)(PVdF) based polymer, polyacrylonitrile(PAN) based polymer, polymethylmethacrylate(PMMA) based polymer, and polyvinyl chloride(PVC) based polymer.

2. The electric double-layered capacitor of claim 1, wherein each of the function-I and function-II polymers is mixed with each other by 5~95 wt % in a total 100 wt % of the polymer material.

3. The electric double-layered capacitor of claim 1, wherein the poly(vinyliden fluoride)(PVdF) based polymer is selected from the group consisting of poly(vinyliden fluoride) and a copolymer of poly[vinyliden fluoride-hexafluoropropylene(HFP)], the polyacrylonitrile(PAN) based polymer is selected from the group consisting of polyacrylonitrile and a copolymer of poly(acrylpnitrile-methylacrylate), the polymethylmethacrylate(PMMA based polymer is selected from the group consisting of polymethylmethacrylate, poly(methylmethacrylate-co-methacrylic acid), and poly(methylmethacrylate-co-methachrylic acid), and the polyvinyl chloride(PVC) based polymer is selected from the group consisting of poly(vinyl chloride), poly(vinylidenechloride-co-acrylonitrilate), and poly(methylmethachrylate-co-methacrylic acid).

4. The electric double-layered capacitor of claim 1, wherein the organic solvent comprises at least one component selected from the group consisting of N-methyl-2-pyrrolidone(NMP), dimethylformamide(DMF), dimethylacetamide(DMA), tetrahydrofuran(THF), dimethyl sulfoxide(DMSO), and acetone and wherein the organic solvent is added to the polymer material by 0~95 wt %.

5. The electric double-layered capacitor of claim 1, wherein the liquid electrolyte comprises a mixture of at least two selected from the group consisting of ethylene carbonate (EC), propylene carbonate(PC), dimethyl carbonate(DMC), diethyl carbonate(DEC), and ethylmethyl carbonate(EMC) solutions having lithium salt dissolved therein, the liquid electrolyte further comprises at least one selected from the group consisting of methyl acetate(MA), methyl propionate (MP), ethyl acetate(EA), and ethyl propionate(EP) for improving a low temperature characteristic of the solutions, and the liquid electrolyte is added to the polymer material by 100~900 wt %.

6. The electric double-layered capacitor of claim 1, wherein a filler is added to the polymer material by 0~20 wt % and the filler comprises at least one selected from the group consisting of $SiO_2$, $TiO_2$, $Al_2O_3$, $BaTiO_3$, zeolite, and a polymer filler.

7. The electric double-layered capacitor of claim 1, wherein the UV-curing initiator comprises at least one selected from the group consisting of 2,2-dimethoxy-2-phenylacetophenone, 2-methoxy-2-phenylacetone, benzyl-dimethyl-ketal, ammonium sulfate, benzophenone, ethyl benzoin ether, isopropyl benzoin ether, α-methyl benzoin ether, benzoin phenyl ether, 2,2-diethoxy acetophenone, 1,1-dichloro acetophenone, 2-hydroxy-2-methyl-1-phenylpropane-1-on, 1-hydroxy cyclohexyl phenyl ketone, antraquinone, 2-ethyl antraquinone, 2-chloroantraquinone, tioxantone, isopropyltioxantone, chloro tioxantone, 2,2-chlorobenzophenone, benzyl benzoate, and benzoyl benzoate and wherein the UV-curing initiator is added to the polymer material by 0.1~5.0 wt %.

8. The electric double-layered capacitor of claim 1, wherein the UV-curing accelerator comprises at least one selected from the group consisting of triethyl amine, tributyl amine, triethanol amine, and N-benzyldimethyl amine and is added to the polymer material by 0.1~5.0 wt %.

9. The electric double-layered capacitor of claim 1, wherein the UV-curing gel type polymer electrolyte is cast on one of a mylar film, non-woven fabric, and separating membrane or an active carbon electrode in direct for UV-curing.

10. The electric double-layered capacitor of claim 1, wherein the electrodes are active carbon electrodes.

* * * * *